United States Patent [19]

Noomen et al.

[11] Patent Number: 5,712,363

[45] Date of Patent: Jan. 27, 1998

[54] OLIGOMERIC STERICALLY HINDERED POLYAMINE CROSSLINKERS AND COATING COMPOSITIONS CONTAINING THE SAME

[75] Inventors: Arie Noomen, Voorhout; Thomas Mezger, Westervoort, both of Netherlands; Klaus Hobel, Erlenbach, Germany; Keimpe Jan van den Berg, Duiven, Netherlands

[73] Assignee: Akzo Nobel NV, Arnhem, Netherlands

[21] Appl. No.: 481,540

[22] PCT Filed: Jan. 4, 1994

[86] PCT No.: PCT/EP94/00015

§ 371 Date: Aug. 28, 1995

§ 102(e) Date: Aug. 28, 1995

[87] PCT Pub. No.: WO94/15974

PCT Pub. Date: Jul. 21, 1994

[30] Foreign Application Priority Data

Jan. 6, 1993 [EP] European Pat. Off. .............. 93200027

[51] Int. Cl.$^6$ .............................. C08F 8/30; C08G 12/00

[52] U.S. Cl. .......................... 528/229; 528/228; 528/246; 528/263; 528/266; 525/259; 525/328.2; 525/328.4; 525/382; 525/421; 525/449; 525/455; 525/471; 525/530; 525/531

[58] Field of Search ........................ 528/228, 229, 528/246, 265, 266; 525/259, 455, 328.2, 328.4, 382, 421, 449, 471, 530, 531

[56] References Cited

U.S. PATENT DOCUMENTS

| | | | |
|---|---|---|---|
| 2,759,913 | 8/1956 | Hulse | 260/89.7 |
| 3,291,775 | 12/1966 | Holm | 260/47 |
| 3,419,534 | 12/1968 | Goodman et al. | 260/77.5 |
| 3,535,342 | 10/1970 | Emmons | 260/340.2 |
| 3,547,886 | 12/1970 | Gardner et al. | 260/47 |
| 3,621,000 | 11/1971 | Schmelzer et al. | 260/77.5 AM |
| 3,657,192 | 4/1972 | Schulz et al. | 260/77.5 AM |
| 3,668,183 | 6/1972 | Hoy et al. | 260/65 |
| 3,793,417 | 2/1974 | Erikson et al. | 264/77.5 AM |
| 3,945,964 | 3/1976 | Hastings et al. | 260/29.6 NR |
| 4,126,640 | 11/1978 | Floyd | 260/583 P |
| 4,193,905 | 3/1980 | Audykowski et al. | 260/30.6 R |
| 4,251,597 | 2/1981 | Emmons et al. | 428/500 |
| 4,279,793 | 7/1981 | Wellner et al. | 260/18 R |
| 4,303,563 | 12/1981 | Emmons et al. | 260/23 AR |
| 4,315,044 | 2/1982 | Elmore et al. | 427/386 |
| 4,318,832 | 3/1982 | Zabrocki et al. | 523/402 |
| 4,352,898 | 10/1982 | Albers | 523/414 |
| 4,362,856 | 12/1982 | Kluger | 528/111 |
| 4,414,250 | 11/1983 | Costanza et al. | 427/386 |
| 4,489,179 | 12/1984 | Tortorello | 523/420 |
| 4,503,174 | 3/1985 | Vasta | 523/439 |
| 4,522,973 | 6/1985 | Ley et al. | 524/555 |
| 4,588,783 | 5/1986 | Chang | 525/329.9 |
| 4,598,108 | 7/1986 | Hoefs | 523/411 |
| 4,608,406 | 8/1986 | Williams, Jr. et al. | 523/424 |
| 4,730,033 | 3/1988 | Horley et al. | 528/288 |
| 4,737,530 | 4/1988 | Hoefs et al. | 523/414 |
| 4,755,623 | 7/1988 | Dileone | 564/160 |
| 4,772,680 | 9/1988 | Noomen et al. | 528/229 |
| 4,835,289 | 5/1989 | Brindopke | 549/229 |
| 4,871,822 | 10/1989 | Brindopke et al. | 526/271 |
| 4,892,954 | 1/1990 | Brindopke et al. | 549/229 |
| 4,904,740 | 2/1990 | Blum et al. | 525/327.3 |
| 4,929,661 | 5/1990 | Noomen et al. | 524/259 |
| 4,937,293 | 6/1990 | Blum et al. | 525/327.6 |
| 4,981,944 | 1/1991 | Bartels et al. | 528/220 |
| 4,990,577 | 2/1991 | Noomen et al. | 525/454 |
| 5,011,994 | 4/1991 | Bartels et al. | 564/278 |
| 5,071,481 | 12/1991 | Maters et al. | 106/287.2 |
| 5,072,020 | 12/1991 | Speranza et al. | 560/25 |
| 5,089,565 | 2/1992 | Blum et al. | 525/375 |
| 5,112,904 | 5/1992 | Feith | 525/59 |
| 5,140,057 | 8/1992 | Saeki et al. | 524/237 |

FOREIGN PATENT DOCUMENTS

| | | | |
|---|---|---|---|
| 0 119 840 | 9/1984 | European Pat. Off. | C07D 317/36 |
| 0 199 087 | 10/1986 | European Pat. Off. | C08F 8/32 |
| 0 270 071 | 6/1988 | European Pat. Off. | C08C 19/42 |
| 0 355 892 | 2/1990 | European Pat. Off. | C08G 59/32 |
| 0 498 615 | 8/1992 | European Pat. Off. | C08L 51/06 |
| 0 568 134 | 11/1993 | European Pat. Off. | G08G 18/08 |
| 40 36 984 | 5/1991 | Germany | C08L 57/12 |
| 61-009411 | 1/1986 | Japan | C08F 8/30 |
| 63-186747 | 8/1988 | Japan | C08C 19/30 |
| 1146 966 | 6/1989 | Japan | C09D 3/72 |
| 1146 968 | 6/1989 | Japan | C09D 3/80 |
| 2053 880 | 2/1990 | Japan | C08F 220/26 |
| 1 229 840 | 4/1971 | United Kingdom | C07C 119/12 |
| 1485925 | 9/1977 | United Kingdom | C07D 317/36 |
| WO 92/07010 | 4/1992 | WIPO | C08F 8/30 |

OTHER PUBLICATIONS

Kirk-Othmer, Encyclopedia of Chemical Technology, vol. 2, pp. 355-376 (1978).

*PCT International Search Report in PCT/EP94/00015 dated May 4, 1994.

*Primary Examiner*—P. Hampton-Hightower
*Attorney, Agent, or Firm*—Loretta A. Miraglia; Louis A. Morris

[57] ABSTRACT

The present invention relates to coating compositions including a particular class of oligomeric sterically hindered polyamines as replacements for traditional blocked and unblocked polyamine crosslinkers. The use of these oligomeric sterically hindered polyamine crosslinkers resultss in a desirable pot life/cure speed relationship not generally available with traditional unblocked polyamine crosslinkers, as well as a lower VOC and often better appearance characteristics than generally available with the traditional blocked varieties.

21 Claims, No Drawings

OLIGOMERIC STERICALLY HINDERED POLYAMINE CROSSLINKERS AND COATING COMPOSITIONS CONTAINING THE SAME

BACKGROUND OF THE INVENTION

The present invention relates generally to oligomeric sterically hindered polyamines and their use as replacements for traditional amine crosslinkers, particularly in the coatings field.

Compositions based upon polyamine crosslinkers and compounds containing amine-reactive functionality are well-known in the literature. As examples of such amine-reactive functionality in combination with polyamine crosslinkers may be mentioned:

(i) activated unsaturated groups such as (meth)acryloyl groups and other groups derived from maleic acid and anhydride, fumaric acid, itaconic acid and anhydride, and crotonic acid and anhydride (see, e.g., U.S. Pat. Nos. 2,759,913, 4,251,597, 4,303,563, 4,730,033, 4,871,822, 4,981,944, 4,990,577, 5,011,994, 5,112,904, WO-A-92/07010, EP-A-568134;

(ii) activated methylene groups such as acetoacetate groups (see, e.g., U.S. Pat. Nos. 3,668,183, 4,772,680, 4,929,661, 5,011,994, WO-A-92/07010, EP-A-568134

(iii) epoxy groups (see, e.g., U.S. Pat. Nos. 3,291,775, 2,547,886, 3,793,417, 3,945,964, 4,126,640, 4,193,905, 4,315,044, 4,318,832, 4,352,898, 4,362,856, 4,489,179, 4,503,174, 4,598,108, 4,608,406, 4,737,530, 5,011,994, WO-A-92/07010, GB-A-1229840, EP-A-568134

(iv) isocyanate groups (see, e.g., U.S. Pat. Nos. 3,621,000, 3,657,192, 3,793,417, 5,011,994, 5,072,020);

(v) aromatic activated aldehyde groups (see, e.g., U.S. Pat. No. 5,071,481, WO-A-92/07010, EP-A-568134

(vi) cyclic carbonate groups (2-oxo-1,3-dioxolane) (see, e.g., JP-A-01146966, JP-A-01146968, JP-A-02053880, WO-A-92/07010, EP-A-568134; and (vii) acid, and anhydride and ester groups (see, e.g., U.S. Pat. Nos. 4,279,793, 4,522,973, 4,588,783, 4,755,623, 4,904,740, 4,937,293, 5,011,994, 5,089,565), including oxalate esters (see, e.g., U.S. Pat. No. 4,414,250, DE-A-4036984, WO-A-92/07010, EP-A-568134.

In general, conventional polyamine crosslinkers with primary amino groups are quite reactive with the above-functionalities under ambient or low stoving temperature conditions (<100° C.). This can result in a too short potlife and consequent application problems.

Acyclic aliphatic secondary amines have also been utilized; however, they exhibit insufficient reactivity towards many of the above-mentioned functionalities, which can lead to improper crosslinking performance.

There thus exists a reactivity gap between the conventional primary and secondary amino groups-containing crosslinkers which as been somewhat filled by the blocking of the primary amino groups with, for example, ketones and aldehydes resulting in, respectively, ketimines and aldimines. The reaction sequence is as follows:

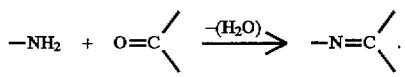

The resulting imine group is stable under anhydrous conditions, but unstable even in the presence of atmospheric humidity. This property has been utilized quite successfully in low and ambient temperature cure applications. The use of ketimines/aldimines, ever, has certain disadvantages.

For example, the deblocking of the primary amino group results in the liberation of a volatile ketone or aldehyde. This liberated component not only adds to the overall VOC of the system, but can also lave toxicological consequences and, under certain circumstances, detrimental consequences to the appearance characteristics of the resulting crosslinked products (e.g., low depth of reflected image in clearcoat applications).

Further in this respect, in light of tougher environmental laws industry has been seeking waterborne alternatives to their longstanding organic solvent based products. Ketimines/aldimines as indicated above, are water sensitive—their hydrolysis is generally so fast that there is no possibility left for controlling reactivity. They are also more hydrophobic than their amine counterparts. It has, therefore, been difficult to formulate waterborne systems utilizing these crosslinkers.

It is, therefore, an object of the present invention to provide a suitable alternative which overcomes these disadvantages of the traditional polyamine and blocked polyamine crosslinkers.

SUMMARY OF THE INVENTION

In accordance with the present invention, the traditional polyamine and blocked polyamine crosslinkers are replaced with certain oligomeric sterically hindered polyamines which comprise, in their overall concept, a backbone having pendant therefrom at least two amino groups, characterized in that (A) the amino groups pendant from the backbone are sterically hindered, (B) the oligomeric sterically hindered polyamine has a molecular weight (Mn) in the range of 200–10000, more preferably 250–3000, and especially 250–2000.

Suitable oligomeric sterically hindered polyamines can be produced, for example, by one of the following methods:

(I) reacting (a) a (cyclo)aliphatic compound containing one sterically hindered amino group and one unhindered amino group, the reactivity ratio of the unhindered amino group and the sterically hindered amino group being ≧90:10, with a substantially equivalent amount (based upon the equivalants of unhindered amino groups) of (b) a compound containing at least two amine-reactive groups;

(II) reacting (a) a secondary nitroalkane with (b) a compound containing at least two active methine reactive groups, then subsequently reducing the nitro groups to amino groups; and (III) reacting (a) a compound containing one reactive group and one tertiary nitro group with (b) a compound containing at least two counterreactive groups, with subsequent reduction of the nitro groups to amino groups.

These oligomeric sterically hindered polyamines find particular use as crosslinkers in coating compositions comprising compounds of the types mentioned above containing amine-reactive functionality, most preferably the activated unsaturated, activated methylene, cyclic carbonate, epoxy and isocyanate varieties. They have been found particularly useful in the formulation of high solids and waterborne coating systems, especially those which cure under ambient or low temperature conditions.

In these and other coatings applications, the sterically hindered polyamines in accordance with the present invention allow formulation of systems having an acceptable pot life/cure speed relationship at ambient and low stoving temperatures (e.g.,<100° C.), with reduced emissions and an overall lower VOC and, in certain cases, better appearance characteristics.

These and other features and advantages of the present invention will be more readily understood by those skilled in the art from a reading of the following detailed description.

DETAILED DESCRIPTION OF THE PREFERRED EMBODIMENTS

As indicated above, the present invention is concerned with oligomeric sterically hindered polyamines comprising, in their overall concept, a backbone having pendant therefrom at least two amino groups, wherein (A) the amino groups pendant from the backbone are sterically hindered, (B) the oligomeric sterically hindered polyamine has a molecular weight (Mn) in the range of 200–10000, more preferably 250–3000, and especially 250–2000.

For clarification purposes, "polyamine" as utilized in the present description refers to a compound containing at least two amino groups.

Further, "oligomeric" in the present description is utilized in one well-known sense to refer to low to medium molecular weight compounds below macromolecular proportions, which is generally considered to be a molecular weight of 10000 or less.

The term "pendant" refers to chains or branched molecular structures which at least partially terminate in the sterically hindered amino groups. These chains or branched molecular structures can be positioned along the backbone or can terminate the same.

"VOC" refers to the volatile organic content of systems, which is normally expressed in numeric terms as grams organic volatiles per liter of organic component (i.e., after abstraction of water and "exempt" solvents). For the purposes of the present specification, the VOC of a coating composition can be determined via the methodology described in ASTM test D2369-90.

Steric hindrance is a well-known concept which, in aspects relevant to the present subject matter, pertains to the spatial arrangement of groups around reactive functionality in order to hinder physical accessibility of that reactivity functionality. This restricted physical accessibility in fact renders the reactive group "less" reactive.

Of course, as a general concept there can exist different degrees of steric hindrance and, consequently, different degrees of reactivity. For the purposes of the present invention, the oligomeric sterically hindered polyamines are preferred if the rate constant of the reaction of the oligomeric sterically hindered polyamine with butyl acrylate as a model amine reactive compound, determined at 60° C. in 1-ethoxy-2-propanol solution, is below $2.0\times10^{-1}$ l/(mol min) and above $2.0\times10^{-4}$ l/(mol min), and preferably below $8.0\times10^{-2}$ l/(mol min) and above $8.0\times10^{-4}$ l/(mol min).

In determining these rate constants, it is assumed that the reactivity of a certain amino group of the crosslinker is lot influenced depending onto which amino group the butyl acrylate adds, and further that the reaction of butyl acrylate with amino groups is second order. Under these assumptions, the reaction rate can be expressed by the following equation:

$$r=k\times[BA]\times[Am]$$

wherein r is the reaction rate, k is the rate constant,

[BA] is the concentration of butylacrylate, and

[Am] is the concentration of amino groups.

Because equivalent amounts of butylacrylate and crosslinker are utilized, and because 1 equivalent of amine is assumed to consume 1 equivalent of butyl acrylate, it can be further assumed that [BA] is equal to [Am]. In this case, the above equation can be rewritten as follows:

$$r=k\times[BA]^2.$$

The rate constant, therefore, can be defined by the following equation:

$$k=(1/t)\times((1/[BA])-(1/[BA]_o))$$

wherein t is the reaction time, and $[BA]_o$ is the initial concentration of butyl acrylate.

This equation allows the calculation of rate constants from observed data, which is obtained by measuring the decrease in the butyl acrylate concentration (via gas chromatography) over time starting from an equivalent mixture of the polyamine crosslinker and butyl acrylate in 1-ethoxy-2-propanol, the components being reacted at 60° C. Further details of this measurement procedure are provided in the examples appended hereto.

Three procedures in particular have been found which are suitable for the production of the desired oligomeric sterically hindered polyamine species:

(I) reacting (a) a (cyclo)aliphatic compound containing one sterically hindered amino group and one unhindered amino group, the reactivity ratio of the unhindered amino group and the sterically hindered amino group being $\geq 90:10$, with a substantially equivalent amount (based upon the equivalents of unhindered amino groups) of (b) a compound containing at least two amine-reactive groups;

(II) reacting (a) a secondary nitroalkane with (b) a compound containing at least two active methine reactive group, then subsequently reducing the nitro groups to amino groups; and (III) reacting (a) a compound containing one reactive group and one tertiary nitro group with (b) a compound containing at least two counterreactive groups, with subsequent reduction of the nitro groups to amino groups.

These three procedures yield compositions comprising a substantial amount of the desired oligomeric sterically hindered polyamines, thereby facilitating the use of these reaction products in the desired manner as crosslinkers for a variety of compounds containing amine reactive functionality.

Referring now to method (I), suitable (cyclo)aliphatic compounds are those with a "reactivity ratio" of the unhindered amino group to the sterically hindered amino group of $\geq 90:10$. A lower reactivity ratio, i.e., a lower selectivity of the diamine will lead to an undesirably broad molecular weight distribution and an undesirably high viscosity during crosslinker preparation.

By "(cyclo)aliphatic" is it meant compound in which the sterically hindered amino group is neither directly attached to an aromatic ring, nor in which an aromatic ring is in an α-position to a carbon attached to the sterically hindered amino group. This is to avoid the toxicity and other technical disadvantages of aromatic amines such as discoloration, yellowing, poor weather resistance and insufficient solubility in certain solvents.

Further, as utilized herein "reactivity ratio" is defined in a normal manner by the following equation:

$$r = \frac{[\text{products derived from reactions involving the unhindered primary amino groups}]}{[\text{products derived from reactions involving the hindered primary amino groups}]}$$

This parameter can be readily determined experimentally via the following standard procedure.

First, the compound containing one sterically hindered primary amino group and one unhindered primary amino group is reacted with an equivalent amount (based on the unhindered primary amino groups) of a model amine-reactive compound. This reaction should be conducted at as low a temperature as possible to achieve substantially complete conversion of the amine-reactive groups within a reasonable period of time. The low temperature is desired because, as temperature increases, selectivity decreases.

For the purposes of the present invention, butyl acrylate has been chosen as the model amine-reactive compound, and a temperature of 20° C. has been utilized with a reaction time 8 hours.

Three different types of reactions of the components are possible—(1) a selective reaction involving only the unhindered primary amino group, (2) an unselective reaction involving both the hindered and unhindered primary amino groups, and (3) a selective reaction involving only the hindered primary amino group. In terms of these: three reactions, the above equation can be expressed as follows:

$$r = \frac{[(1)] + [(2)]}{[(3)] + [(2)]}.$$

It is, however, assumed due to the relatively low reactivity the hindered primary amino groups that reaction (3) will at best be negligible and can be neglected. The above equation, therefore, becomes $$r = \frac{[(1)] + [(2)]}{[(2)]}.$$

The unselective reaction (2) will lead to unreacted diamine in the reaction mixture, the content of which can be detected, e.g., by gel permeation chromotography. Due to the fact that stoichiometric amounts of starting components are utilized (based upon unhindered primary amino groups), the content of unselective reaction product is consequently equal to the content of unreacted diamine.

Further, the content of the desired selective reaction product with the unhindered primary amino group will be equal to the original content of the model amine-reactive compound (butyl acrylate) less the content of the unselective reaction product, that is, less the content of the unreacted diamine. The above equation, therefore, becomes $$r = \frac{[\text{amine-reactive compound in feed}]}{[\text{unreacted diamine in reaction product}]}.$$

As suitable (cyclo)aliphatic compounds containing one sterically hindered amino, group and one unhindered amino group possessing the required reactivity ratio may be mentioned 2-methylpiperazine, 1,2-diaminopropane, 1,2-diamino-2-methylpropane, 1,2-diamino-2,3-dimethylbutane, 1,3-diaminopentane and isophorone diamine.

As suitable compounds containing at least two amine-reactive groups for use in method (I) may be mentioned compounds of the types mentioned above which contain amine-reactive functionality and which, when reacted with the unhindered amine group-containing compounds, result in an oligomeric sterically hindered polyamine meeting the general conditions detailed above. As specifically preferred examples may be mentioned at least difunctional epoxy, blocked and unblocked isocyanate, activated unsaturated, activated methylene and cyclic carbonate groups-containing compounds.

As examples of suitable epoxy groups-containing compounds may be mentioned the glycidyl ethers of (cyclo) aliphatic or aromatic hydroxyl compounds, such as ethylene glycol, butane glycol, glycerol, cyclohexane diol, mononuclear di- or polyvalent polyols, bisphenols such as Bisphenol-A or Bisphenol-F, and polynuclear phenols; epoxidized and optionally hydrogenated divinyl benzene; polyglycidyl ethers of phenol formaldehyde novolac; epoxy compounds containing an isocyanurate group; an epoxidized polyalkadiene such as epoxidized polybutadiene; hydantoin epoxy resins; epoxy resins obtained by epoxidization of (cyclo)aliphatic alkenes such as dipentene dioxide, dicyclopentadiene dioxide and vinylcyclohexane dioxide; and glycidyl group-containing resins such as polyesters, polyurethanes, polyepoxyesters and polyacrylics.

As examples of suitable isocyanate groups-containing compounds may be mentioned (cyclo)aliphatic or aromatic polyisocyanates such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethylhexamethylene diisocyanate, 2,4,4-trimethylhexamethylene diisocyanate, dodecamethylene diisocyanate, $\Omega,\Omega'$-dipropylether diisocyanate, 1,3-cyclopentane diisocyanate, 1,2-cyclohexane diisocyanate, 1,4-cyclohexane diisocyanate, isophoron diisocyanate, 4-methyl-1,3-diisocyanatocyclohexane, trans-vinylidene diisocyanate, dicyclohexylmethane-4,4'-diisocyanate, 3,3'-dimethyldicyclohexylmethane-4,4'-diisocyanate, a toluene diisocyanate, 1,3-bis(isocyanatomethyl)benzene, a xylylene diisocyanate, 1,5-dimethyl-2,4-bis(isocyanatomethyl) benzene 1,5-dimethyl-2,4-bis(2-isocyanatoethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl methane, a diisocyanatonaphthalene; compounds such as 1,3,5-triisocyanatobenzene and 2,4,6-triisocyanatotoluene; the adduct of two molecules of a diisocyanate (such as hexamethylene or isophoron diisocyanate) with one molecule of a diol (such as ethylene glycol); the condensate of three molecules of a diisocyanate (such as hexamethylene diisocyanate) with one molecule of water; the adduct of three molecules of a diisocyanate (such as toluene or isophorone diisocyanate) with one molecule of trimethylolpropane; the adduct of 4 molecules of a diisocyanate (such as toluene diisocyanate) with one molecule of pentaerythritol; and the isocyanurate trimer of a diisocyanate (such as hexamethylene diisocyanate).

Preferred isocyanates are in the blocked formed obtainable by reaction of isocyanates such as mentioned above with well-known blocking agents:. Examples of such well-known blocking agents include ketoximes like methyl ethyl ketoxime and compounds bearing phenolic OH groups.

As examples of suitable activated unsaturated groups-containing compounds may be mentioned (moth)acrylic esters of polyols such as ethylene glycol, propylene glycol, diethylene glycol, tetramethylene diol, neopentyl glycol, hexamethylene diol, cyclohexane diol, bis(4-hydroxycyclohexyl)methane, glycerol, trimethylolethane, trimethylolpropane, pentaerythritol, polyester polyols and polyacrylic polyols; adducts of a hydroxyl group-containing (meth)acrylic ester to an at least difunctional isocyanate or epoxy compound; unsaturated polyesters built up in part from one or more of maleic acid and anhydride, fumaric acid, itaconic acid and anhydride, or crotonic acid and anhydride; acrylic and methacrylic amide functional compounds such as N,N-methylenebisacrylic amide and the condensation product of 4 moles of acrylic amide with 1 mole of terephthaldialdehyde; reaction products of at least difunctional epoxides with (meth)acrylic acid; and acrylated melamine resins.

As examples of suitable activated methylene groups-containing compounds may be mentioned the reaction products of diketene or an alkyl acetoacetate with a polyol having two or more hydroxyl groups, for example, monomeric polyols such as mentioned above as well as polyester polyols such as polycaprolactone polyols, epoxy resins obtained by reacting epichlorohydrin with a diaryloyl alkane, and acrylic polyols obtained by the addition polymerization of hydroxyl group-containing (meth)acrylic monomers optionally with other addition polymerizable monomers; and oligomers/polymers obtained by (co) polymerizing monomer units having one or more acetoacetate groups, for example, the acetoacetate esters of hydroxyalkyl (meth)acrylates or allyl alcohol monomer units.

As example of suitable cyclic carbonate groups-containing compounds may be mentioned those produced by the addition of $CO_2$ to an epoxy groups-containing compound such as those mentioned above via any one of a number of well-known procedures such as disclosed in U.S. Pat. Nos. 3,535,342, 4,835,289, 4,892,954, GB-A-1485925 and EP-A-0119840.

Of course, compounds containing mixtures of the above functionalities may also be utilized, for example, glycidyl (meth)acrylate; addition polymers built up at least in part from glycidyl group-containing monomers in which a portion of the glycidyl groups have been reacted with, for example, acrylic acid, or in which a portion of the glycidyl groups have been converted to cyclic carbonate groups as mentioned above.

Further details on these and other suitable compounds containing at least two amine-reactive groups are well-known in the art as exemplified by the previously noted references.

Suitable oligomeric sterically hindered polyamines can be produced by reacting the components under conditions well-known for the reaction of amino groups with these various functionalities. As indicated before, however, the reaction temperature should be kept as low as possible in order to increase the selectivity of the reaction with the unhindered amino groups. As such, it is preferred that the reaction temperature be $\leq 80°$ C. (and preferably $\leq 60°$ C.) for the somewhat less reactive functionalities such as the cyclic carbonates, and $\leq 60°$ C. (and preferably $\leq 40°$ C.) for the more highly reactive functionalities such as the unblocked isocyanates.

In order to further avoid unwanted reaction with the sterically hindered amino groups, it is preferred that the components be reacted in a substantially equivalent ratio of unhindered amino groups/counterreactive functionality of 0.9–1.1, more preferably 0.95–1.05 and especially substantially stoichiometric (1.0). Use of an excess of diamine is a drawback because the excess diamine either remains in the product which can cause problems associated with low molecular weight amines (such as volatility, smell and irritancy), or the excess diamine has to be distilled off in additional step which is energy and time consuming.

If desired, for example to achieve a certain hydrophilic/lipophilic balance in the crosslinker, a portion of the amine-reactive functional groups of the backbone may be reacted beforehand, concurrently and/or subsequently with a monoamine, especially a fatty amine. The result is that the amine functionality of the crosslinker may be somewhat lowered, but the overall property profile may be improved.

Referring now to method (II), as suitable secondary nitroalkanes may be mentioned 2-nitropropane, 2-nitrobutane, 2-nitropentane, 3-nitropentane and nitrocyclohexane.

As suitable compounds containing at least two active methine reactive groups may be mentioned the above-described at least difunctional epoxy, blocked and unblocked isocyanate, activated unsaturated and cyclic carbonate groups-containing compounds.

Conditions for reacting the secondary nitroalkanes with the compounds containing the active methine reactive groups are well-known in the art, with the choice of parameters not being as critical as with method (I).

A preferred example can be illustrated based upon the reaction of an acrylic amide groups-containing compound (activated unsaturated) with a secondary nitroalkane such as 2-nitropropane. The acrylic amide groups-containing compound is dissolved in a suitable solvent such as N,N-dimethylformamide, a catalytic amount of a strong base added, followed by the dropwise addition of an equivalent amount of the secondary nitroalkane. After addition of the secondary nitroalkane, the reaction mixture is heated for 3–6 hours at 30°–60° C. Upon completion, the reaction mixture is neutralized with an acid, the solvent is evaporated and the residue is purified by recrystallization and/or washing with water.

Subsequently, the nitro groups of the reaction product are reduced to amine groups via any one of a number of well-known procedures. See, generally, Kirk-Othmer, *Encyclopedia of Chemical Technology*, Volume 2, pages 355–376 (1978). In a preferred method, the nitro functional reaction products are dissolved in an alcoholic solvent and reduced over Raney nickel catalyst. The hydrogen pressure during reduction should be low, generally between 10 and 40 bars, and the temperature between 40° C. and 120° C. Under these conditions, reaction times for almost quantitative conversion of the nitro groups to amino groups are generally between 1 and 8 hours. When no more hydrogen uptake is observed, the reaction mixture is filtered and the solvent evaporated leaving the amino groups-containing crosslinker.

Referring now to method (III), as suitable compounds containing one reactive group and one tertiary nitro group may be mentioned 2-methyl-2-nitro-1-propanol, 2-ethyl-2-nitro-1-propanol and 2-hydroxymethyl-2-nitrocyclohexane.

As other such suitable compounds containing one hydroxyl group and one tertiary nitro group may be mentioned the condensation products of secondary nitroalkanes, such as those mentioned above, with aldehydes and ketones, and the addition products of such secondary nitroalkanes to compounds containing an activated unsaturated group and another reactive group which is substantially unreactive with an activated methine group, such as the hydroxyalkyl esters of (meth)acrylic acid and the N-hydroxyalkyl (meth)acrylic amides.

Suitable counterreactive groups for the reactive groups of the above tertiary nitro compounds will be evident to those skilled in the art based the functionality of such reactive group. The reaction conditions of the reactive and counterrreactive groups will also be evident to one skilled in the art based upon the choice of functionality.

In the preferred embodiment, OH is the reactive group of the tertiary nitro compound and isocyanate is the preferred counterreactive group. As suitable compounds containing at least two isocyanate groups may be mentioned the blocked and unblocked varieties specified above for use in method (I). The reaction of the OH and optionally blocked isocyanate groups may be carried out under standard conditions well-known to those skilled in the art.

Subsequent to the reaction of the reactive and counterreactive groups, the tertiary nitro groups of the reaction product are then reduced to primary amino groups in any well-known manner as indicated above in relation to method (II).

As mentioned earlier, these oligomeric sterically hindered polyamines are especially suitable for use as replacements for the traditional polyamine and blocked polyamine crosslinkers in a wide variety of amine crosslinked systems. Due to the use of the oligomeric sterically hindered polyamines, such coatings will possess a substantially lower VOC than coatings utilizing the blocked amine (ketimine and aldimine) counterparts.

Indeed, coating compositions can be formulated possessing a VOC of less than 450, more preferably less than 350, and especially less than 250, grams organic volatiles/liter of organic component utilizing these oligomeric sterically hindered polyamines. The VOC applies whether or not the coating is waterborne (water as the primary diluent), organic solvent based (organic solvent as the primary diluent), or even solventless.

These coating compositions may be formulated utilizing the oligomeric sterically hindered polyamines by means well-known in the industry such as described in the numerous already incorporated references.

In general, it is preferred that such coating compositions should contain the oligomeric sterically hindered polyamines in an amount so as to result in 0.25–4 (more preferably 0.5–2 and especially 0.8–1.25) equivalents of amino groups per equivalent of amine-reactive groups of the functionalized compounds.

The coating compositions may also contain other well-known and ususal additives such as pigments, fillers, levelling agents, foam suppressing agents, rheology control agents, catalysts, anti-oxidants, UV-stabilizers, minor amounts of co-solvents as required, etc., the only limitation in this respect being that these additives be compatible with the other components of the coating composition. This information is in general well-known or readily available to those skilled in the art.

Such coating compositions can be formulated for application by any known manner and onto any type of substrate.

Potential end uses for such coatings include: primers, pigmented topcoats and clearcoats for car refinishing; parquet lacquers; primers and topcoats for steel protection; wood coatings; and coatings for plastic substrates.

The foregoing general discussion of the present invention will be exemplified by the following examples offered by way of illustration and not limitation on the scope thereof.

In these examples, the rate constants were determined via the following procedure. First, a gas chromatograph was calibrated with solutions of known concentrations of butylacrytate in 1-ethoxy-2propanol. 0.0115 mol (based upon the amino groups) of the polyamine crosslinker was placed in a 25 ml calibrated flask, dissolved in 10 ml 1-ethoxy-2-propanol, then 0.0115 mol butylacrylate added. Additional 1-ethoxy-2-propanol was added to a total volume of 25 ml. 5.0 g of this mixture were then transferred to a septum vial, which was immediately placed in an oil bath heated to 60° C. A number of butylacrylate concentrations were measured via GC over a period of 4–5 hours. Rate constant values were calculated for these measured concentrations, and the results averaged to arrive at the reported values.

Further, gloss was determined with the aid of a Byk-Gardner micro-TRI-gloss apparatus, and distinctness of reflected image was determined with the aid of a portable distinctness of reflected image meter model 1792 of ATI Systems Inc.

EXAMPLES

Preparation of Crosslinker via Method I (1) Addition product of 2-methylpiperazine and acryloyl-functional resin The acryloyl functional resin utilized was the esterification product, in the presence of Cr(III)-2-ethylhexanoate as catalyst, of an epoxy-functional acrylic resin with 1.15 equivalents acrylic acid. The epoxy-functional acrylic resin was built up from 38.2 wt % glycidylmethacrylate, 45.1 wt % 3,3,5-trimethylcyclohexylmethacrylate and 16.7 wt % butyl acrylate, and possessed an Mn of 921 and Mw of 1750 (as measured by GPC calibrated with a polypropyleneglycol standard).

Under a nitrogen atmosphere and at room temperature (between 25°–30° C.), 150.0 g of a 71.4% solution of the acryloyl functional resin (0.21 mol of activated unsaturated groups) in Solvesso 100 was added over a period of three hours to a slurry of 21.1, g (0.21 mol) 2-methylpiperazine in 10.0 g of 1-methoxy-2-propanol. The temperature of the reaction mixture was maintained by cooling with a waterbath, and the mixture was stirred until the contents appeared homogenous. The reaction was allowed to proceed until IR analysis indicated that no acryloyl groups remained.

(2) Addition product of 2-methylpiperazine and unsaturated polyester resin

The unsaturated polyester resin utilized was built up from 160.5 g 2-ethyl-2-butyl-1,3-propanediol, 75.0 g 1,2-cyclohexanedicarboxylic anhydride and 514.5 g maleic anhydride, and possessed an acid value of 5, a C=C equivalent of 3, an Mn of 1010 and an Mw of 1960.

Under a nitrogen atmosphere and at a temperature of 40° C., 387.2 g of a 76.5% solution of an unsaturated polyester resin (0.89 mol of activated unsaturated groups) in xylene was added over a period of 1.5 hours to a slurry of 82.2 g (0.89 mol) 2-methylpiperazine in 24.1 g of 1-methoxy-2-propanol. After completion of the addition, the components were allowed to react another 2.5 hours at 40° C., at which point the reaction mixture was cooled and stored at room temperature.

Obtained was a solution of a polyamine crosslinker having a rate constant of $3.752 \times 10^{-3}$ l/(mol min).

(3) Addition product of 2-methylpiperazine and oligofunctional epoxide

The oligofunctional epoxide utilized was prepared by reacting a mixture of 200.0 g of a technical diglycidyl ether of glycerol (commercially available Under the trade designation Glycidether 100 from Raschig GmbH), 38.8 g (0.24 mol) hexamethylene diisocyanate, 1.0 g dibutyltindilaurate and 250 ml dry butylacetate, under a nitrogen atmosphere and at reflux conditions until IR analysis (2300 cm−1) indicated that that no isocyanate groups remained. The bulk of the solvent was distilled off to leave an oligofunctinoal epoxide with an epoxide number of 227 mg KOH/g resin.

Under a nitrogen atmosphere and at a temperature of 20° C., 130.6 g of this oligofunctional epoxide (0.53 mol epoxide groups) were dissolved in 200 ml 2-propanol and 52.8 g (0.52 mol) 2-methylpiperazine added. The mixture was stirred at 20° C. until no further epoxide functionality could be detected by titration (about 24 hours). At this point, GPC indicated that the content of free 2-methylpiperazine was below 0.5 wt %.

Obtained was a solution of a polyamine crosslinker having an amine number of 195 mg KOH/g resin (504 of the amine value was due to non-crosslinking tertiary amino groups), and a rate constant of $2.059 \times 10^{-2}$ l/(mol min).

(4) Addition product of 2-methylpiperazine and oligofunctional cyclic carbonate

An oligofunctional epoxide was produced by reacting a mixture of 500.0 g of a technical diglycidyl ether of glycerol (commercially) available under the trade designation Glycidether 100 of Raschig GmbH), 298.2 g of a 704 solution of a technical trimer of isophorone diisocyanate (commercially available under the trade designation VESTANAT 1890L of Hüls AG), 3.0 g dibutyltindilaurate and 750 ml butyl acetate, under a nitrogen atmosphere and at reflux conditions until IR analysis (2300 cm−1) indicated that no isocyanate groups remained. After completion of the addition reaction, the bulk of the butylacetate was distilled off and 375 ml of 1-ethoxy-2-propanol added to result in 1109.7 g of a solution of the oligofunctional epoxide.

The oligofunctional cyclic carbonate was prepared by placing this solution in an autoclave with 5.0 g tetrabutylammoniumiodide. $CO_2$ was introduced at a pressure of 20 bar and the mixture reacted at 120° C. with repeated refills of $CO_2$ until $CO_2$ consumption ceased (about 6 hours). After cooling to 40° C., the excess $CO_2$ was released. Obtained was a solution of a cyclic carbonate resin having an epoxy number of 6 mg KOH/g resin and a cyclic carbonate number of 140 mg KOH/g resin.

Under a nitrogen atmosphere and at a temperature of 50° C., 180.0 g (0.45 mol of cyclic carbonate) of the above-prepared cyclic carbonate solution and 48.0 g (0.45 mol) of 2-methylpiperazine were stirred until IR analysis (1800 cm−1) indicated that no cyclic carbonate groups remained (about 9 hours).

Obtained was a solution of a polyamine crosslinker having an amine number of 127 mg KOH/g resin, and a rate constant of $4.149 \times 10^{-3}$ l/(mol min).

(5) Addition product of 1,3-diaminopentane and oligofunctional cyclic carbonate

Under a nitrogen atmosphere and at a temperature of 50° C., 18.0 g (0.45 mol of cyclic carbonate) of cyclic carbonate solution prepared in (4) and 46.1 g (0.45 mol) of 1,3-diaminopropane were stirred until IR analysis (1800 cm−1) indicated that no cyclic carbonate groups remained (about 5 hours).

Obtained was a solution of a polyamine crosslinker having an amine number of 118 mg KOH/g resin, and a rate constant of $1.849 \times 10^{-2}$ l/(mol min).

(6) Addition product of 2-methylpiperazine and oligofunctional cyclic carbonate

A mixture of 200 g (0.5 mol of cyclic carbonate) of the cyclic carbonate solution prepared in (4) and 33.5 g (0.167 mol of a distilled cocoamine (commercially available under the trade designation ARMEEN CD from Akzo Chemicals) were heated to 90° C. under nitrogen for 7 hours. The amine number of the resulting solution was 3 mg KOH/g resin.

Under a nitrogen atmosphere and at a temperature of 50° C., 114.3 g of the above-modified cyclic carbonate solution and 17.8 g (0.167 mol) of 2-methylpiperazine were stirred until IR analysis (1800 cm−1) indicated that no cyclic carbonate groups remained (about 10 hours).

Obtained was a solution of a polyamine crosslinker having an amine number of 80 mg KOH/g resin.

(7) Addition product of 1,3-diaminopropane and oligofunctional cyclic carbonate

Under a nitrogen atmosphere and at a temperature of 50° C., 114.31 g of the modified cyclic carbonate solution from (6) and 17.1 g (0.167 mol) of 1,3-diaminopropane were stirred until IR analysis (1800 cm-1) indicated that no cyclic carbonate groups remained (about 4 hours).

Obtained was a solution of a polyamine crosslinker having an amine number of 77 mg KOH/g resin.

Preparation of Crosslinker via Method II (8) Addition product of 2-nitropropane and N,N'-methylenebisacrylic amide with subsequent reduction of nitro groups To a solution of 123.4 g (0.8 mol) N,N'-methylenebisacrylic amide and 5 g of a solution of benzyltrimethylammonium hydroxide in methanol (commercially available under the trade designation of Triton B) in 250.0 g of N,N-dimethylformamide were added, under a nitrogen atmosphere at room temperature over a period of 0.5 hours, 445.0 g (5 mol) of 2-nitropropane. During the addition, the internal temperature of the reaction mixture increased to 40%. After completion of the addition, the temperature was increased to 70% and maintained for 3 hours. Subsequently, the reaction mixture was cooled to room temperature and neutralized with acetic acid, then the excess 2-nitropropane and solvent were distilled off under reduced pressure. The residual solid was washed with 100 ml cold water and 100 ml hexane.

After drying, 231.2 g of a white solid were obtained. $^1$H-NMR(CDCl$_3$) analysis revealed the product to be dinitro functional.

Into a 1 liter autoclave were placed 20.0 g (60 mmol) of this dinitro compound, 250 ml methanol and 2.0 g Raney nickel catalyst. The autoclave was purged with nitrogen then hydrogen was introduced to a pressure of 30 bar. The autoclave was heated to 80° C. and maintained at that temperature for 4 hours, during which the hydrogen pressure was maintained at 30 bar. After cooling to room temperature and release of pressure, the mixture was filtered to remove catalyst and the methanol distilled off.

Obtained was 15.9 g of a white solid with an amine number 403 mg KOH/g resin (98% of theory), and a rate constant of $6.577 \times 10^{-3}$ l/(mol min).

(9) Addition product of 2-nitropropane and tetrafunctional acrylic amide with subsequent reduction of nitro groups A mixture of 67.1 g (0.5 mol) of terephthaldialdehyde, 177.8 g (2.5 mol) acrylic amide, 0.3 g hydroquinone, 3.0 ml concentrated HCl and 600 ml chloroform were refluxed on a water separator for 2.5 hours. During this time a white solid precipitated which, after cooling, was filtered off and washed three times with 100 ml water. After drying, 168.4 g of a white solid were obtained. $^1$H-NMR(d$_6$-DMSO) analysis revealed the product to be tetrafunctional acrylic amide.

To a solution of 38.2 g (0.1 mol) of this tetrafunctional acrylic amide and 5 g of a solution of benzyltrimethylammonium hydroxide in methanol (commercially available under the trade designation of Triton B) in 250.0 g of N,N-dimethylformamide were added under a nitrogen atmosphere at room temperature over a period of 0.5 hours, 89.0 g (1 mol) of 2-nitropropane. After completion of the addition, the temperature was increased to 80° C. and maintained for 6 hours. Subsequently, the reaction mixture was cooled to room temperature and neutralized with acetic acid, then the excess 2-nitropropane and solvent were distilled off under reduced pressure. The residual solid was washed with 100 ml cold water and 100 ml hexane. After drying, 51.7 g of a white solid were obtained. $^1$H-NMR(d$_6$-DMSO) analysis revealed the product to be tetranitro functional.

Into a 1 liter autoclave were placed 20.0 g (27 mmol) of this tetranitro compound, 250 ml methanol and 2.0 g Raney nickel catalyst. The autoclave was purged with nitrogen then hydrogen was introduced to a pressure of 30 bar. The autoclave was heated to 80° C. and maintained at that temperature for 4 hours, during which the hydrogen pressure was maintained at 30 bar. After cooling to room temperature and release of pressure, the mixture was filtered to remove catalyst and the methanol distilled off. The solid residue was washed with 10 ml of cold acetone.

Obtained was 12.5 g of a white solid with an amine number of 343 mg KOH/g resin (95% of theory).

Preparation of Crosslinker via Method III

(10) Addition product of 2-nitro-2-methylpropanol and trimer isocyanate with subsequent reduction of nitro groups To 175.4 g (0.5 mol NCO) of a 70% solution of a technical trimer of isophorone diisocyanate (commercially available under the trade designation VESTANAT 1890L from Hüls AG) and 0.5 g dibutyltindilaurate was added a solution of 59.6 g (0.5 mol) of 2-nitro-2-methylpropanol in 125 ml of dry ethylacetate. The mixture was refluxed until IR analysis (2300 cm−1) indicated that no NCO remained. The ethylacetate and part of the solvent from the Vestanat 1890L were evaporated under reduced pressure. 214.3 g of a nitrofunctional intermediate remained, which was dissolved in 500 ml methanol.

To the methanol solution were added 5.0 g of Raney nickel and, dropwise over a period 1 hours, 250.0 g (5 mol) of hydrazinehydrate, during which time the temperature increased to 40° C. After addition of the hydrazinehydrate, the mixture was refluxed until no more gas evolved from the reaction mixture, indicating complete decomposition of the hydrazine. The mixture was then filtered to remove catalyst and the solvent distilled off.

Obtained was 145.6 g of a light green solid with an amine number of 163 mg KOH/g resin (97% of theory), and a rate constant of $1.464 \times 10^{-3}$ l/(mol min).

(11) Addition product of 2-nitro-2-methylpropanol and trimer isocyanate with subsequent reduction of nitro groups To 175.4 g (0.5 mol NCO) of a 70% solution of a technical trimer of isophorone diisocyanate (commercially available under the trade designation VESTANAT 1890L from Hüls AG) and 0.5 g dibutyltindilaurate was added a solution of 26.8 g (0.125 mol) of tetradecanol in 60 ml dry ethylacetate, and the mixture refluxed for 2 hours. A solution of 44.7 g of 2-nitro-2-methylpropanol in 60 ml of dry ethylacetate was then added over a period of 15 minutes, and the mixture refluxed until IR analysis (2300 cm−1) indicated that no NCO remained. The ethylacetate and part of the solvent from the VESTANAT 1890L were evaporated under reduced pressure. 203.3 g of a nitrofunctional intermediate remained, which was dissolved in 500 ml methanol.

To the methanol solution were added 5.0 g of Raney nickel and, dropwise over a period 1 hours, 200.0 g (4 mol) of hydrazinehydrate, during which time the temperature increased to 40° C. After addition of the hydrazinehydrate, the mixture was refluxed until no more gas evolved from the reaction mixture, indicating complete decomposition of the hydrazine. The mixture was then filtered to remove catalyst and the solvent distilled off.

Obtained was 175.6 g of a light green solid with an amine number of 103 mg KOH/g resin (90% of theory).

Comparative Polyketimine Crosslinker (K1) Under a nitrogen atmosphere, 1.5 moles of dipropylene triamine, 3.3 moles of 5-methyl heptanone-3, 113.0 g of toluene and 2% by weight (based upon the amine) of zinc acetate were charged into a reaction vessel and heated to boiling point, the water evolved being removed by azeotropic distillation. After about 10 hours, 53.9 g of water (99.84 of the theoretical amount) had been collected. The resulting solution (containing a ketimine intermediate product) was cooled to 60° C. and filtered.

In another reactor, 444.0 g of isophorone diisocyanate and 0.2 g of dibutyltin dilaurate were heated to a temperature of 40° C., after which a solution of 118.0 g of 1.6-hexane diol in 117.0 g of toluene was added over a period of 2 hours. After one additional hour of reaction, an isocyanate intermediate product was obtained having an isocyanate content of 11.54 by weight.

930.5 g of the ketimine intermediate product solution was then added to the prepared isocyanate intermediate product at a temperature of 60°–80° C. and over a period of one hour, and the reaction mixture maintained at 80° C. for an additional hour until substantially all of the isocyanate groups had been consumed. After addition of another 167.2 g of toluene, cooling and filtration, an oligomeric polyketimine crosslinker was obtained with an equivalent weight of 229.6 (on solution) and a color of less than 1 on the Gardner scale.

Amine-Reactive Component for Coating (A1) The first amine-reactive component is a 61.54 solution in xylene/Solvesso 100/petrol (b.p. 140°–165° C.) of an acrylated acrylic copolymer commercially available under the trade designation SETALUX® 7101 SS 62 from Akzo Resins (C=C equivalent weight of 1331 based on solution).

(A2) The second amine-reactive component was an acrylated acrylic resin produced as follows.

In a reactor, 732.5 g of butylacetate and 67.8 g of ethylacetate were heated to reflux. Subsequently, over a period of 4 hours, was added a mixture of 395.5 g of 2-hydroxyethyl methacrylate, 604.7 g of glycidyl methacrylate, 389.2 g of lauryl methacrylate and 810.5 g of styrene. Concurrently, there was separately added, over a period of 4.5 hours, a mixture of 154.0 g of 2,2-azo-bis(2,4-dimethylvaleronitrile) (commercially available under the trade designation NOURY® AVN of Akzo Chemicals), 498.4 g of butylacetate and 102.2 g of ethylacetate. After addition of the initiator, the mixture was cooled to 80° C. then, over a period of ½ hours, a mixture of 11.0 g of NOURY AVN and 42.9 g of butyl acetate was added.

The solvent was then distilled off at 140° C., the mixture cooled to 120° C., 780.0 g of methoxypropylacetate added and the solvent again distilled off under vacuum at 0.85 bar. The mixture was cooled to 110° C. under throughput of air.

To the resulting product was added a mixture of 292.6 g of acrylic acid, 3.0 g of 2,2-di-tert.butyl p.cresol (commercially available under the trade designation IONOL CP from Shell) and 0.3 g of phenothiazine. The temperature of the mixture was allowed to increased to 120° C. via the exothermic reaction of the components, then maintained at this temperature until an acid value of less than 2 was achieved, after which 418.8 g of hexahydrophthalic acid anhydride and 4.6 g of dibutyltin oxide were added. The reaction was allowed to proceed another two hours, after which the mixture was cooled to 60° C. and diluted with butylglycol to a solids content of 65%. The resulting product possessed a C=C equivalent weight of 1157 (on solution).

Evalution as Clearcoat

Clearcoat 1

A first clearcoat was prepared by mixing 85 g of amine-reactive component (A1), 52 g of crosslinker (1), 21.9 g of n-butylacetate, 14.6 g of methoxy-1-propylacetate-2, 14.6 g of propyleneglycol monomethylether and 21.9 g of xylene.

Clearcoat 2

A second clearcoat was prepared by mixing 85 g of amine-reactive component (A1), 36 g of crosslinker (2), 23.4 g of n-butylacetate, 15.6 g of methoxy-1-propylacetate-2, 15.6 g of propyleneglycol monomethylether and 23.4 g of xylene.

Comparative Clearcoat 1

A first comparative clearcoat was prepared by mixing 100 g of amine-reactive component (A1), 25 g of comparative polyketimine crosslinker (K1), 24 g of n-butylacetate, 6 g of methoxy-1-propylacetate-2, 14.5 g of propyleneglycol monomethylether and 9 g of xylene.

The VOC and potlife (the time in which the initial viscosity of ca. 17 seconds DIN cup 4 increased to ca. 30 seconds) of each of these coatings was determined.

Further, these compositions were applied as a clearcoat in a car refinish system built up from ca. 50 µm of a polyurethane primer (commercially available under the trade designation AUTOCRYL® 3+1 filler from Akzo Coatings), ca. 15 µm of a metallic basecoat (commercially available under the trade designation AUTOBASE® from Akzo Coatings) and ca. 60 µm of the clearcoat. After one week, the gloss at 20° and 60° was measured. The distinctness of reflected image (D.O.R.I.) was measured after one day and one week. The results are as follows:

|  | VOC | Potlife | Gloss | | D.O.R.I. | |
|---|---|---|---|---|---|---|
|  | (g/liter) | (hours) | 20° | 60° | 1 day | 1 week |
| Clearcoat 1 | 575 | 4.5 | 90 | 94 | 87 | 82 |
| Clearcoat 2 | 589 | 5 | 91 | 94 | 85 | 86 |
| Comp. Clearcoat 1 | 618 | 7 | 92 | 95 | 69 | 65 |

Formulation of Waterborne Coatings

Waterborne Coating 1

A first waterborne coating was prepared by mixing 100 g of amine-reactive component (A2), 4.9 g of crosslinker (8), 7.3 g of methanol and 7.3 g of demineralized water.

Waterborne Coating 2

A second waterborne coating was prepared by mixing 100 g of amine-reactive component (A2), 3.2 g of crosslinker (9), 6.4 g of methanol and 6.4 g of demineralized water.

These waterborne coatings were tested for geltime. Furthermore, these waterborne coatings were applied with a drawbar onto a tin plated metal sheet to a dry layer thickness of ca. 50 µm, then tested for Persoz hardness after curing for 1 day and 1 week at 20° C. water resistance (1 day) after curing for one week at 20° C., and petrol resistance (5 minutes) after curing for one week at 20° C. The results are as follows:

|  | Geltime | Persoz Hard. | | Resistance Against | |
|---|---|---|---|---|---|
|  | (hours) | 1 day | 1 week | water | petrol |
| W.Coating 1 | 5 | 99 | 196 | good[1] | excel. |
| W.Coating 2 | 20 | 51 | 112 | good[1] | excel. |

1 = very slight softening

We claim:

1. A method of lowering the volatile organic content (VOC) of a coating composition comprising using an oligomeric sterically hindered polyamine as a polyamine crosslinker in a coating composition based upon an amine crosslinkable resin and a polyamine crosslinker wherein the oligomeric sterically hindered polyamine comprises an oligomeric backbone having pendant therefrom at least two amino groups, wherein (A) the amino groups pendant from the backbone are sterically hindered, and (B) the oligomeric sterically hindered polyamine has a molecular weight (Mn) of about 200–10,000.

2. A method of improving the distinctness of reflective image of a film resulting from the application onto a substrate of a coating composition based upon an amine crosslinkable resin and a polyamine crosslinker, wherein the method comprises using an oligomeric sterically hindered polyamine as a polyamine crosslinker in the coating composition wherein the oligomeric sterically hindered polyamine comprises an oligomeric backbone having pendant therefrom at least two amino groups, wherein (A) the amino groups pendant from the backbone are sterically hindered, and (B) the oligomeric sterically hindered polyamine has a molecular weight (Mn) in the range of 200–10,000.

3. The method of claim 1 wherein the coating composition is a waterborne coating composition.

4. The method of claim 1 wherein the coating composition is an organic solvent based coating composition.

5. The method of claim 1 wherein the amine crosslinkable resin includes amine-reactive functionality selected from activated unsaturated groups, activated methylene groups, cyclic carbonate groups, epoxy groups and isocyanate groups.

6. The method of claim 1 wherein the oligomeric sterically hindered polyamine has a rate constant of the reaction with butyl acrylate as a model amine reactive compound, determined at 60° C. in 1-ethoxy-2-propanol solution, below $2.0 \times 10^{-1}$ l/(mol.min) and above $2.0 \times 10^{-4}$ l/(mol.min).

7. An organic solvent based coating composition based upon an amine crosslinkable resin, an amine crosslinker therefor and an organic solvent as the primary diluent, wherein the amine crosslinker is an oligomeric sterically hindered polyamine comprising an oligomeric backbone having pendant therefrom at least two amino groups, wherein (A) the amino groups pendant from the backbone are sterically hindered, and (B) the oligomeric sterically hindered polyamine has a molecular weight (Mn) in the range of 200–10000, the coating composition possessing a volatile organic content (VOC)≦450 g organic volatiles/liter of organic component.

8. A waterborne coating composition based upon an amine crosslinkable resin, an amine crosslinker therefor and water as the primary diluent, wherein the amine crosslinker is an oligomeric sterically hindered polyamine comprising an oligomeric backbone having pendant therefrom at least two amino groups, wherein (A) the amino groups pendant from the backbone are sterically hindered, and (B) the oligomeric sterically hindered polyamine has a molecular weight (Mn) in the range of 200–10000.

9. The waterborne coating composition according to claim 8, wherein the coating composition possesses a volatile organic content (VOC)≦450 g organic volatiles/liter of organic component.

10. The coating composition of claim 7 wherein the amine crosslinkable resin includes amine-reactive functionality selected from activated unsaturated groups, activated methylene groups, cyclic carbonate groups, epoxy groups and isocyanate groups.

11. The coating composition of claim 7 wherein the oligomeric sterically hindered polyamine has a rate constant of the reaction with butyl acrylate as a model amine reactive compound, determined at 60° C. in 1-ethoxy-2-propanol solution, below $2.0\times10^{-1}$ l/(mol min) and above $2.0\times10^{-4}$ l/(mol min).

12. A clearcoat composition comprising the coating composition of claim 7.

13. A method of producing an oligomeric sterically hindered polyamine crosslinker comprising an oligomeric backbone having pendant therefrom at least two amino groups, wherein
    (A) the amino groups pendant from the backbone are sterically hindered, and
    (B) the oligomeric sterically hindered polyamine comprises a molecular weight (Mn) in the range of 200–10000, by reacting (a) a (cyclo)aliphatic compound containing one sterically hindered amino group and one unhindered amino group, the reactivity ratio of the unhindered amino groups and the sterically hindered amino group being $\geq 90:10$, with a substantially equivalent amount (based upon the equivalents of unhindered amino groups) of (b) a compound containing at least two amine-reactive groups.

14. A method of producing an oligomeric sterically hindered polyamine crosslinker comprising an oligomeric backbone having pendant therefrom at least two amino groups, wherein
    (A) the amino groups pendant from the backbone are sterically hindered, and
    (B) the oligomeric sterically hindered polyamine comprises a molecular weight (Mn) in the range of 200–10000, by reacting (a) a secondary nitroalkane with (b) a compound containing at least two active methine reactive groups, with subsequent reduction of the nitro groups to primary amino groups.

15. The method of claim 2 wherein the coating composition is a waterborne coating composition.

16. The method polyamine of claim 2 wherein the coating composition is an organic solvent based coating composition.

17. The method polyamine of claim 2 wherein the amine crosslinkable resin includes amine-reactive functionality selected from activated unsaturated groups, activated methylene groups, cyclic carbonate groups, epoxy groups, and isocyanate groups.

18. The method of claim 2 wherein the oligomeric sterically hindered polyamine has a rate constant of the reaction with butyl acrylate as a model amine reactive compound, determined at 60° C. in 1-ethoxy-2-propanol solution, below $2.0\times10^{-1}$ l/(mol.min) and above $2.0\times10^{-4}$ l/(mol.min).

19. The coating composition of claim 8 wherein the amine crosslinkable resin includes amine-reactive functionality selected from the group consisting of activated unsaturated groups, activated methylene groups, cyclic carbonate groups, epoxy groups and isocyanate groups.

20. The coating composition of claim 8 wherein the oligomeric sterically hindered polyamine has a rate constant of the reaction with butyl acrylate as a model amine reactive compound, determined at 60° C. in 1-ethoxy-2-propanol solution, below $2.0\times10^{-1}$ /(mol.min) and above $2.0\times10^{-4}$ l/(mol.min).

21. A clearcoat composition comprising the coating composition of claim 8.

* * * * *